(12) United States Patent
Kim et al.

(10) Patent No.: US 8,570,930 B2
(45) Date of Patent: Oct. 29, 2013

(54) LOCATION BASED VEHICLE MULTIHOP PROTOCOL UNICAST APPARATUS AND ROUTING METHOD USING THE APPARATUS

(75) Inventors: Min Jung Kim, Daejeon (KR); Sangwoo Lee, Daejeon (KR); Hyun Kyun Choi, Daejeon (KR); Han Byeog Cho, Daejeon (KR); Hyun Seo Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 318 days.

(21) Appl. No.: 12/949,362

(22) Filed: Nov. 18, 2010

(65) Prior Publication Data

US 2011/0134840 A1 Jun. 9, 2011

(30) Foreign Application Priority Data

Dec. 8, 2009 (KR) ......... 10-2009-0121379
Mar. 9, 2010 (KR) ......... 10-2010-0020962

(51) Int. Cl.
*H04Q 7/00* (2006.01)

(52) U.S. Cl.
USPC ... 370/313; 370/338; 370/395.31; 455/404.2; 455/428

(58) Field of Classification Search
USPC .......... 370/313, 338, 395.21; 455/414.1, 428, 455/556.1
See application file for complete search history.

(56) References Cited

U.S. PATENT DOCUMENTS

2008/0186869 A1   8/2008   Jeon et al.

FOREIGN PATENT DOCUMENTS

| KR | 10-0810662 | 7/2008 |
| KR | 10-2009-0054163 | 5/2009 |

OTHER PUBLICATIONS

Valery Naumov et al., "Connectivity-Aware Routing (CAR)in Vehicular Ad-Hoc Networks.", INFOCOM'07, 2007.

*Primary Examiner* — Yemane Mesfin
*Assistant Examiner* — Wanda Z Russell
(74) *Attorney, Agent, or Firm* — Staas & Halsey LLP

(57) ABSTRACT

In order for a source node including a vehicle multihop protocol unicast apparatus to route data to a destination node, the source node broadcasts a location request message to neighbor node and receives a location response message from the neighbor nodes in response to the location request message. Therefore, the source node routes unicast data on the basis of the location information of the destination node included in the location response message. At this time, the source node uses a location based forwarder selecting algorithm in order to select a forwarder.

13 Claims, 5 Drawing Sheets

LOCATION BASED VEHICLE MULTIHOP PROTOCOL UNICAST APPARATUS AND ROUTING METHOD USING THE APPARATUS

CROSS-REFERENCE TO RELATED APPLICATION

This application claims priority to and the benefit of Korean Patent Application Nos. 10-2009-0121379 and 10-2010-0020962 filed in the Korean Intellectual Property Office on Dec. 8, 2009 and Mar. 9, 2010, the entire contents of which are incorporated herein by reference.

BACKGROUND OF THE INVENTION (a) Field of the Invention

The present invention relates to a location based vehicle multihop protocol (VMP)-unicast apparatus for two vehicles out of a communication zone to perform a unicast communication by using a multihop routing function in a vehicular ad-hoc network (VANET) and a routing method using the apparatus.

(b) Description of the Related Art

Topology is rapidly changed in a communication environment between vehicles unlike a network environment. Therefore, it is difficult to consistently maintain a routing path up to a destination of the vehicle. As a result, a node to which data will be forwarded is should be designated according to the situation on the basis of location information of the destination.

Greedy perimeter stateless routing (GPSR) is generally used among unicast routing algorithms based on the location information. The GPSR is a routing algorithm in which assumed that the location of the destination node is known, a node among nodes in the communication zone, which is close to the destination node is selected and a packet is forwarded to the selected node.

The GPSR may be smoothly operated under a condition without an obstacle like an expressway. However, when the node close to the destination node is just selected as the forwarding node in the state in which communication is invalid due to surrounding buildings like an urban environment, the packet may not be transferred to the destination.

Greedy perimeter coordinator routing (GPCR) is a routing algorithm developed to overcome the problem of the GPSR. When a node at an intersection is set as a coordinator and the packet is forwarded to the coordinator, the packet may be transferred to the destination even though a line of sight (LOS) is not secured due to the building like an urban.

However, in the case of the GPCR, when the nodes at an intersection are selected as the coordinator, traffics are concentrated on the nodes, such that the packet may not be normally transferred.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a location based vehicle multihop protocol (VMP) unicast apparatus adoptable in an expressway and an urban environment, and a routing method using the apparatus.

An exemplary embodiment of the present invention provides a VMP-unicast apparatus that includes:

a message processing unit extracting first node information on at least one neighbor node by broadcasting a hello message to the neighbor node, and generating and transmitting a unicast message on the basis of the first node information; a location information processing unit receiving location information data on a node and verifying second node information of the node included in the location information data; a vehicle location processing unit storing the second node information received from the location information processing unit, verifying the location of a destination node to which the unicast message will be transmitted, and routing the unicast message; and a forwarder selecting unit verifying a location of a destination node, transferring a location response message to a source node by unicast based on the first node information, and selecting a forwarder to forward a packet.

Another embodiment of the present invention provides a method in which a source node including a VMP-unicast apparatus routes data to a destination node that includes:

allowing the source node to broadcast a location request (LREQ) message to neighbor nodes; receiving a location response (LRES) message in response to the location request message from the neighbor nodes and verifying location information of the destination node included in the location response message; and routing unicast data on the basis of the location information of the destination node.

DETAILED DESCRIPTION OF THE EMBODIMENTS

Figure 1:
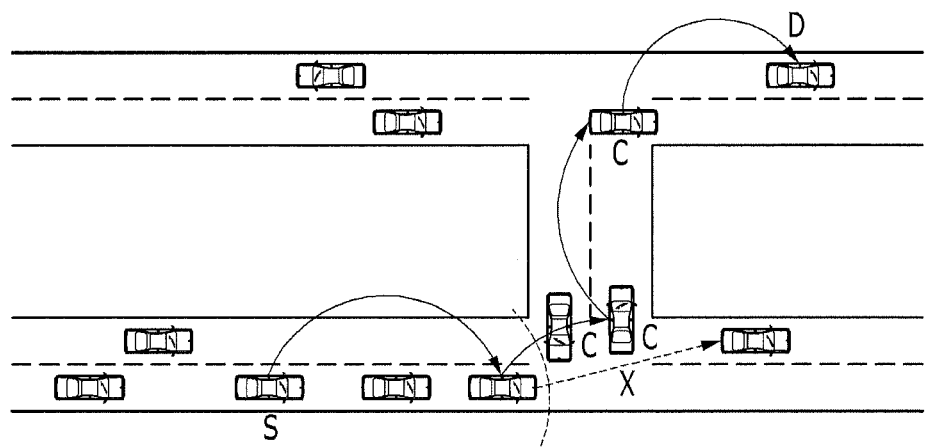
FIG. 1 is an exemplary diagram setting a routing path in vehicle unicast multihop communication according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements.

Hereinafter, a location based VMP-unicast routing method will be described with reference to the accompanying drawings.

FIG. 1 is an exemplary diagram setting a routing path in vehicle unicast multihop communication according to an exemplary embodiment of the present invention.

As shown in FIG. 1, a location based vehicle multihop protocol unicast (hereinafter, for convenience of description, referred to as "VMP-unicast") routing algorithm finds a current location of a vehicle destination and determines a forwarder that will forward data by using a location based forward selecting module up to the current location to transfer the data up to a final destination.

A coordinator positioned at an intersection is preferentially considered in selecting the forwarder. When a plurality of coordinators are present, the forwarder is selected considering directions of the coordinators, current communication traffics of the coordinators, etc. On the contrary, when no coordinator is present, a node closest to a destination is selected as the forwarder. This may be applied to a condition such as an expressway.

Next, the structure of an apparatus installed in a vehicle for the VMP-unicast described in FIG. 1 will be described with reference to FIG. 2.

Figure 2:
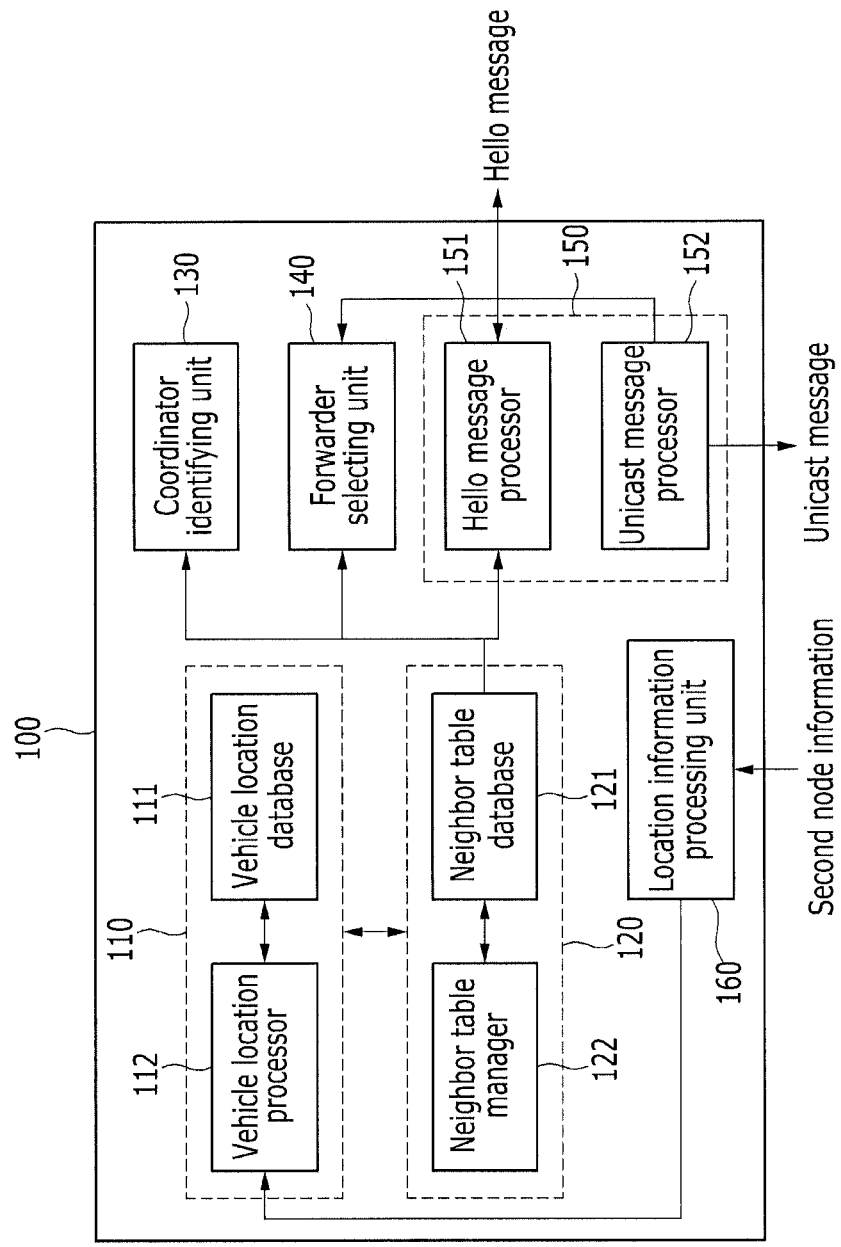
FIG. 2 is a block diagram of an apparatus for a vehicle multihop protocol unicast according to an exemplary embodiment of the present invention.

FIG. 2 is a block diagram of an apparatus for a VMP-unicast according to an exemplary embodiment of the present invention.

As shown in FIG. 2, the VMP-unicast apparatus 100 includes a vehicle location processing unit 110, a neighbor management unit 120, a coordinator identifying unit 130, a forwarder selecting unit 140, a message processing unit 150, and a location information processing unit 160.

The vehicle location processing unit 110 includes a vehicle location database 111 and a vehicle location processor 112, and receives location information data and verifies second node information included in the location information data. The message processing unit 150 includes a hello message processor 151 and a unicast message processor 152, and extracts node information by broadcasting a hello message to adjacent nodes and generates and transmits a unicast message on the basis of the node information. In addition, the neighbor management unit 120 includes a neighbor table database 121 and a neighbor table manager 122, and stores and manages node information on adjacent nodes.

First, the hello message processor 151 of the message processing unit 150 broadcasts the hello message to the adjacent nodes at a predetermined cycle. In addition, the hello message processor 151 extracts first node information including current node location information, current speed information, etc. of the adjacent nodes from a response message for the hello message received from the adjacent nodes. A frame structure of the hello message and information included in the hello message will be described afterwards.

The unicast message processor 152 generates and transmits a unicast message for transferring data up to an actual destination node on the basis of first node information of the adjacent nodes, which is stored in the neighbor table database 121 when the location of the destination node is determined. The unicast message includes an ID of the destination node and location information of the destination node.

The neighbor table database 121 constitutes a neighbor table by the first node information of the adjacent nodes included in the hello message received by the hello message processor 151. The neighbor table manager 122 controls to periodically update the neighbor table database 121.

The location information processing unit 160 receives location information data from the outside through an interface and verifies the second node information on a current a current node location, a vehicle speed, a vehicle moving direction, a current time receiving the location information data, etc. included in the location information data. The verified second node information is transferred to and stored in the vehicle location database 111. Although GPS data is used as the location information data in the embodiment of the present invention, the GPS data is not necessarily limited thereto.

When the vehicle location processor 112 receives the unicast message to be transmitted to the destination node, which is generated by the unicast message processor 152, the vehicle location processor 112 searches whether or not the first node information of the destination node is stored in the neighbor table stored in the neighbor table database 121 in order to find the location of the destination node before transmitting the unicast message.

If the destination node to which the unicast message will be transmitted is not stored in the neighbor table database 121, that is, if the destination node is not a neighbor node of a source node, a location request (LREQ) message for finding the current location of the destination node on the basis of the ID of the destination node is generated and broadcasted to the adjacent node.

However, if the destination node is stored in the neighbor table database 121, that is, the destination node is the neighbor node of the source node, the unicast message is transmitted. The neighbor node receiving the unicast message compares its own ID with the ID of the destination node included in the unicast message.

In addition, when its own ID does not coincide with the ID of the destination node, the unicast message is broadcasted to the neighbor node again. However, when its own ID coincides with the ID of the destination node, a node receiving the LREQ message becomes the destination node, such that the neighbor node transfers a location response message including its own location information to the source node to notify its current location.

The vehicle location database 111 stores first node information of the adjacent node received from the vehicle location processor 112 or second node information received from the location information processing unit 160.

When the forwarder selecting unit 140 verifies the location of the destination node through the location response message, the forwarder selecting unit 140 receives the first node information of the destination node from the neighbor table database 121 and transfers the location response message to the source node by the unicast. In addition, the forwarder selecting unit 140 selects a forwarder to which a packet will be forwarded among neighbor nodes recognized as the coordinator. Herein, a method of selecting the forwarder will now be described.

The coordinator identifying unit 130 judges whether or not it corresponds to the coordinator node on the basis of the current location of the vehicle. A forwarder selecting algorithm is performed in order to judge to correspond to the coordinator and it will be described afterwards.

A method of supporting the VMP-unicast through the above-mentioned apparatus will be described with reference to FIG. 3. In the embodiment of the present invention, for convenience of description, a node transmitting unicast data is referred to as the source node and a node receiving unicast data is referred to as the destination node. In addition, a neighbor node receiving the message broadcasted from the source node in order to find the destination node is referred to as a first neighbor node and a second neighbor node.

Figure 3:
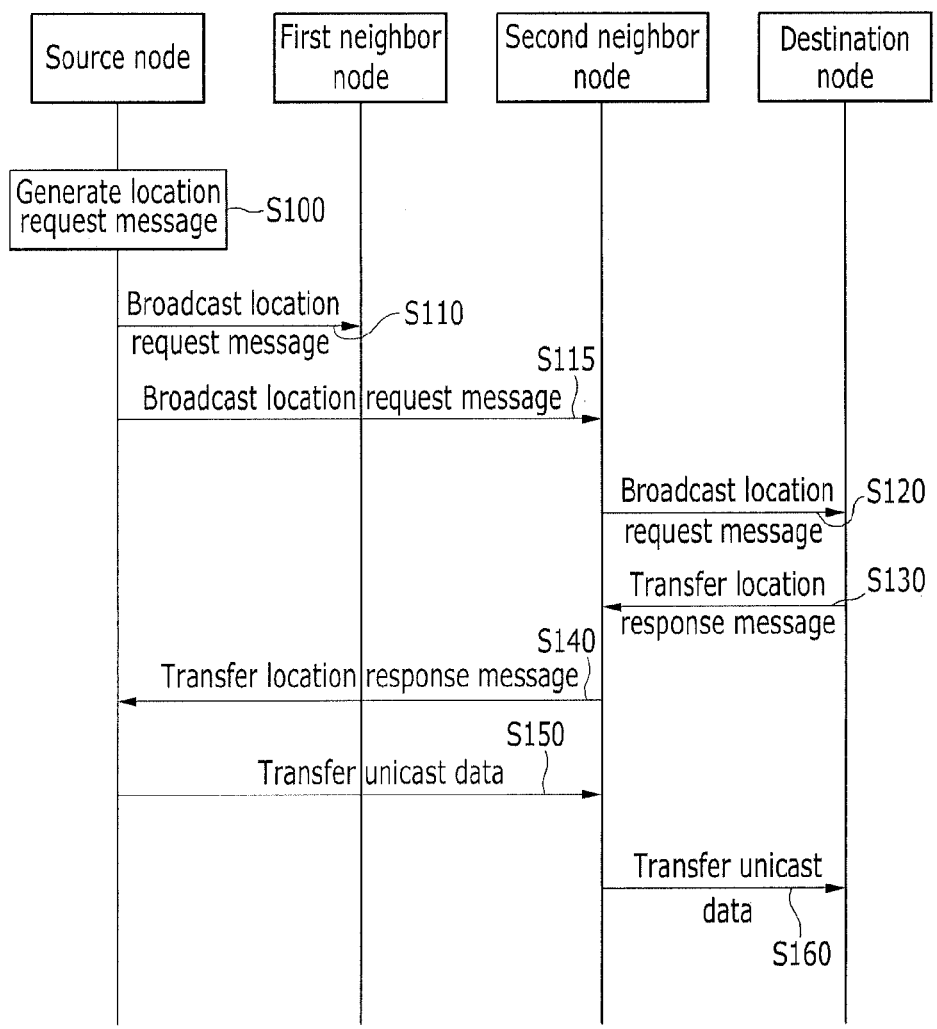
FIG. 3 is a flowchart of message processing in vehicle unicast multihop communication according to an exemplary embodiment of the present invention.

FIG. 3 is a flowchart of message processing in vehicle unicast multihop communication according to an exemplary embodiment of the present invention.

As shown in FIG. 3, it is assumed that a source node previously knows an ID of a destination node for transferring a message to the destination node by the unicast. In addition, when node information on the destination node is stored in a neighbor table database 121, the destination node is within a communication range of the source node. In this case, the source node directly transmits data to the destination node.

However, when the node information on the destination node is not stored in the neighbor table database 121, a vehicle location processor 112 generates a location request (LREQ) message in order to find the location of the destination node on the basis of the already known ID of the destination node (S100). In addition, the generated LREQ message is broadcasted to neighbor nodes (S110 and S115). Herein, the LREQ message includes the ID of the destination node, the location information of the source node, and sequence number information.

A first neighbor node and a second neighbor node that receive the LREQ message verify the ID of the destination node included in the LREQ message and compare their own IDs with the ID of the destination node. If the first neighbor node or the second neighbor node, which receives the LREQ message, itself is not the destination node, it is verified whether or not the first node information of the destination node is stored in the neighbor table database 121 and when the first node information is stored in the neighbor table database 121, the LREQ message is broadcasted to the neighbor nodes again (S120).

However, if the first node information is not stored in the neighbor table database 121, the LREQ message is discarded. In the embodiment of the present invention, it is assumed that the first node information of the destination node is not stored in the first neighbor node and the first node information of the destination node is stored in the second neighbor node.

If an ID of another node receiving the LREQ message coincides with the ID of the destination node, it is verified that the corresponding node is the destination node. In this case, the corresponding node generates a location response (LRES) message and includes location information of the current destination node to transfer it to a node broadcasting the LREQ message (S130). Through such a procedure, the LRES message is transferred to the source node firstly transmitting the LREQ message by using the unicast communication to notify the destination node's own location (S140).

When the source node transmitting the LREQ message receives the LRES message, the source node knows the current location of the destination node. In addition, unicast data is transmitted based on the location information of the destination node (S150). At this time, when a forwarder selecting unit 140 selects a forwarder which is a node forwarding data, the unicast data is transferred to the corresponding forwarder and finally, data reaches the destination node which is the destination (S160).

Next, a method for the forwarder selecting unit 140 to generate a hello message exchanged between nodes where a hello message processing 151 is present in a communication radius and select the forwarder in order to collect node information of a node, in particular, to identify a coordinator node positioned at an area such as an intersection area will be described.

Since the hello message is generated and broadcasted at a predetermined cycle, the hello message may be generated and broadcasted while the message is processed in the vehicle unicast multihop communication described in FIG. 3 or before the message is generated or after the message is processed. First, a hello message generation procedure will be described with reference to FIG. 4.

Figure 4:
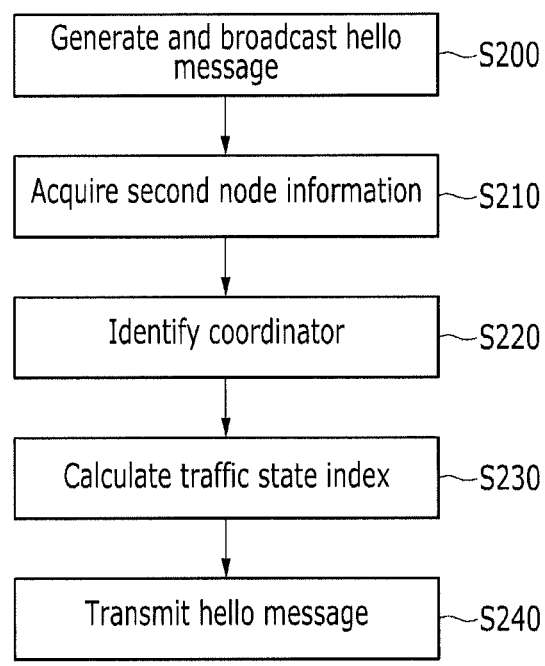
FIG. 4 is a flowchart showing a procedure of generating hello messages exchanged between nodes according to an exemplary embodiment of the present invention.

FIG. 4 is a flowchart showing a procedure of generating hello messages exchanged between nodes according to an exemplary embodiment of the present invention.

As shown in FIG. 4, the hello message processor 151 generates the hello message and broadcasts the generated hello message to neighbor nodes (S200). At this time, the hello message processor 151 acquires second node information in order to broadcast the hello message including the second node information such as a current location, speed, direction, time information, and node's own ID information that are included in GPS information received by the location information processing unit 160 (S210). Herein, a message frame of the hello message is shown in Table 1.

TABLE 1

| Control type | Source node ID | Time stamp | Location | Speed | Direction | Coordinator | Traffic state index |
|---|---|---|---|---|---|---|---|

| Time value | Description |
|---|---|
| 0 | Hello |
| 1 | Multihop broadcast frame |
| 2 | Single hop broadcast frame |
| 3 | Unicast frame |
| 4 | Geo broadcast frame |

In the embodiment of the present invention, the hello message including information indicating whether or not the node transmitting the hello message is the coordinator node positioned at the intersection area is broadcasted. Therefore, through an algorithm identifying whether or not the nodes are the coordinator node, it is identified whether or not the nodes are the coordinator (S220).

In addition, the nodes judge their own traffic states and include a capability to forward a packet in the hello message so as to refer to it at the time of selecting the forwarder. For this, a traffic state index is calculated (S230) and the hello message is transmitted (S240). Therefore, it is possible to prevent traffic for a forwarding packet from being increased in a predetermined coordinator. Herein, a method of calculating the traffic state index has been already known and thus, will not be described in detail in the embodiment of the present invention.

Meanwhile, the coordinator identifying algorithm executed at step S220 may be variously present and for example, when the hello message is received from three or more directions based on directions of the nodes in the neighbor table, the node receiving the hello message may set itself as the coordinator. Alternately, the node may be set as the coordinator by the traffic state index's counting the number of currently transmitted and received messages and the node may be set as the coordinator on the basis of the number of data of a currently occupying queue. In the embodiment of the present invention, the algorithm to set the node as the coordinator is not limited to any one algorithm. In addition, the neighbor table is shown in Table 2.

TABLE 2

| Source node ID | Time stamp | Location | Speed | Direction | Coordinator | TCI | valid |
|---|---|---|---|---|---|---|---|
| 123xxxx... | Sep. 5, 2012 12:13:05 | 29.12736, 130.18263 | 30 | N | C | High | Y |
| 000xxxx... | Sep. 5, 2012 12:13:30 | 29.12736, 130.18264 | 40 | E | N | Low | Y |

Next, a method for neighbor nodes receiving the LREQ message to find the location of the destination node and transmit the LRES message will be described with reference to FIG. 5.

Figure 5:
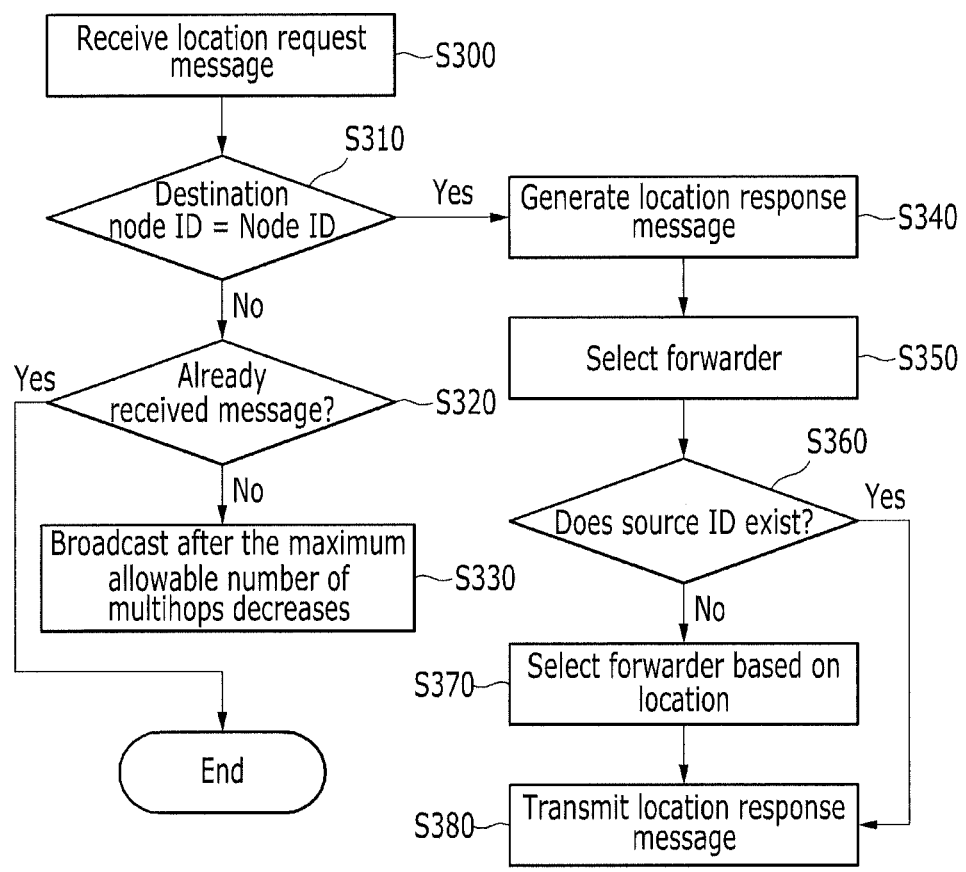
FIG. 5 is a flowchart of finding the location of a destination node according to an exemplary embodiment of the present invention.

FIG. 5 is a flowchart of finding the location of a destination node according to an exemplary embodiment of the present invention.

The LREQ message generated by the vehicle location processor 112 includes the ID of the destination node together with information including the ID of the source node, the location information of the source node, the maximum allowable number of multihops, etc. The LREQ message generated as above is broadcasted to the neighbor nodes.

When the neighbor node receives the LREQ message (S300), the neighbor node compares its own ID with the ID of the destination node and judges whether or not the IDs coincide with each other (S310). If two IDs do not coincide with each other, the neighbor node judges whether the received LREQ message is the already received LREQ message or a newly received LREQ message (S320).

In order to judge it, the node compares and checks sequences numbers of the LREQ messages with each other. If the received LREQ message is the newly received LREQ message, the maximum allowable number of multihops is decreased and thereafter, the message is broadcasted to the neighbor nodes again (S330). However, if the received message is the already received message, the process is terminated without broadcasting the corresponding message to the neighbor nodes.

Meanwhile, if the ID of the destination node coincides with the node's own ID, since the node receiving the LREQ message is the destination node, the corresponding node generates an LRES message including the node's own location (S340). The node generates the LRES message and thereafter, selects the forwarder in the neighbor table through a location based forwarder selecting algorithm (S350).

In addition, the node judges whether or not the ID of the destination node included in the LRES message, that is, node information corresponding to the ID of the forwarder is stored in the neighbor table database 121 (S360). If the source node information is stored, the LRES message is transferred to the forwarder by using the unicast (S380). When the forwarder also receives a message designating itself as the forwarder, the forwarder judges whether or not the node information corresponding to the destination node is stored in the neighbor table database 121.

However, when the node information on the destination node is not stored in the neighbor table database 121, a subsequent forwarder is selected (S370) and the LRES message is transmitted to the selected forwarder (S380). The location based forwarder selecting algorithm proposed in the embodiment of the present invention is as follows.

For each node n in NT
If (C(NT)==0) then GPSR(NT)

-continued

If (C(NT)==1) then FID = CID
   If (number of Coordinator is more than 1)
      For each coordinator m in NT
         FID = min(Pi*Pos(Loc(m).Loc(des(ID)) + Pj*TCI(m))

Herein, C(NT) represents the number of coordinators and GPSR(NT) represents greedy perimeter stateless routing which is the routing protocol. FID represents the ID of the forwarder, CID is the ID of the coordinator, and Pi represents a priority of location vector difference. Further, Pj represents a priority of traffic condition index (TCI) and Pos(loc1, loc2) represents location vector difference between a first location and a second location.

The location based forwarder selecting algorithm according to the embodiment of the present invention selects the node closest to the destination node by using the existing GPSR algorithm when the coordinator node is not present in the neighbor table. However, when the number of coordinator nodes is one, the corresponding coordinator node is selected as the forwarder and the packet is forwarded to the corresponding coordinator node.

On the contrary, when a plurality of coordinator nodes are present, any one of a node having the same movement direction as the destination node or a node having current low traffic is selected as the forwarder and the packet is forwarded to the corresponding node. When the LRES message is transferred up to the source node, the source node can determine the location of the destination node. In addition, the unicast message can be transferred up to the destination node by performing the location based forwarder selecting algorithm.

According to an embodiment of the present invention, it is possible to more stably transfer a message in a communication environment between vehicles in which topology is rapidly changed by decentralizing concentration of forwarding traffics on a predetermined node entering an intersection at the time of transferring a unicast message to multihops in the communication environment between the vehicles.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A vehicle multihop protocol (VMP) unicast apparatus, comprising:
   a message processing unit extracting first node information on at least one neighbor node by broadcasting a hello message to the neighbor node, and generating and transmitting a unicast message on the basis of the first node information;
   a location information processing unit receiving location information data on a node and verifying second node information of the node included in the location information data;
   a vehicle location processing unit storing the second node information received from the location information processing unit, verifying the location of a destination node to which the unicast message will be transmitted, and routing the unicast message,
   wherein the first node information includes location information and speed information of the neighbor node and the second node information includes information including the location of the node, the speed of node, a movement direction, and time information; and
   a forwarder selecting unit verifying a location of a destination node, transferring a location response message to a source node by unicast based on the first node information, and selecting a forwarder to forward a packet.

2. The apparatus of claim 1, further comprising:
   a neighbor management unit receiving, storing, and managing the first node information on the neighbor node extracted from the message processing unit; and
   a coordinator identifying unit judging whether or not a node corresponds to a coordinator node on the basis of current location information of the node.

3. The apparatus of claim 1, wherein:
   the message processing unit includes,
   a hello message processor broadcasting the hello message to the neighbor node at a predetermined cycle and extracting the first node information from the neighbor nodes; and
   a unicast message processor generating the unicast message for transferring data to the destination node of which the location is determined on the basis of the first node information and transmitting the generated unicast message.

4. The apparatus of claim 3, wherein:
   the neighbor management unit includes,
   a neighbor table database constituting a neighbor table with the first node information of the neighbor node; and
   a neighbor table manager controlling the neighbor table database to be updated at a predetermined cycle.

5. The apparatus of claim 3, wherein:
   the vehicle location processing unit includes,
   a vehicle location database storing the second node information verified by the location information processing unit; and
   a vehicle location processor receiving the unicast message generated by the unicast message processor, verifying the location of the destination node to which the unicast message will be transmitted, and routing the unicast message.

6. A method in which a source node including a vehicle multihop protocol (VMP)-unicast apparatus routes data to a destination node, comprising:
   extracting first node information on at least one neighbor node by broadcasting a hello message to the neighbor node, and generating and transmitting a unicast message on the basis of the first node information;
   receiving location information data on a node and verifying second node information of the node included in the location information data;
   storing the second node information received from the location information processing unit, verifying the location of a destination node to which the unicast message will be transmitted, and routing the unicast message,
   wherein the first node information includes location information and speed information of the neighbor node and the second node information includes information including the location of the node, the speed of node, a movement direction, and time information;
   verifying a location of a destination node, transferring a location response message to a source node by unicast based on the first node information, and selecting a forwarder to forward a packet;
   allowing the source node to broadcast a location request (LREQ) message to neighbor nodes;
   receiving a location response (LRES) message in response to the location request message from the neighbor nodes and verifying location information of the destination node included in the location response message; and
   routing unicast data on the basis of the location information of the destination node.

7. The method of claim 6, wherein:
   the location request message includes an ID of the destination node, location information of the source node, and a sequence number.

8. The method of claim 6, further comprising:
   allowing a node to generate a first hello message;
   allowing the node to acquire its own second node information and broadcast the second node information including the generated first hello message to a neighbor node; and
   receiving a second hello message including location information from the neighbor node in response to the first hello message.

9. The method of claim 8, further comprising:
   verifying whether or not the neighbor node receiving the first hello message is a coordinator node;
   calculating a traffic state index indicating a current traffic state of the neighbor node; and
   transmitting the second hello message including coordinator identifying information and the traffic state index information to the node.

10. The method of claim 8, wherein:
    the first hello message includes information including a current location, speed, direction of the source node, time information, coordinator information, and ID information of the source node.

11. The method of claim 7, further comprising:
    allowing the neighbor node receiving the LREQ message from the source node,
    to judge whether or not its own ID coincides with the ID of the destination node;
    to generate the LRES message including its location information and ID information of the destination node that will receive the LRES message when its own ID coincides with the ID of the destination node;
    to select a forwarder to which the LRES message will be transmitted; and
    to transmit the LRES message to the destination node.

12. The method of claim 11, further comprising:
    judging whether or not the LREQ message is an already received message on the basis of the sequence number when the corresponding node's ID does not coincide with the ID of the destination node; and broadcasting the LREQ message to the neighbor node when the LREQ message is not the already received message.

13. The method of claim 11, wherein:

the selecting a forwarder includes, judging whether or not the ID information of the destination node is stored; and selecting the forwarder on the basis of the number of coordinators, a routing protocol, an ID of the forwarder, an ID of a coordinator, a priority of a location vector difference, a priority of a traffic state, and a difference of a location vector when the ID information of the destination node is not stored.

* * * * *